Figure 1:
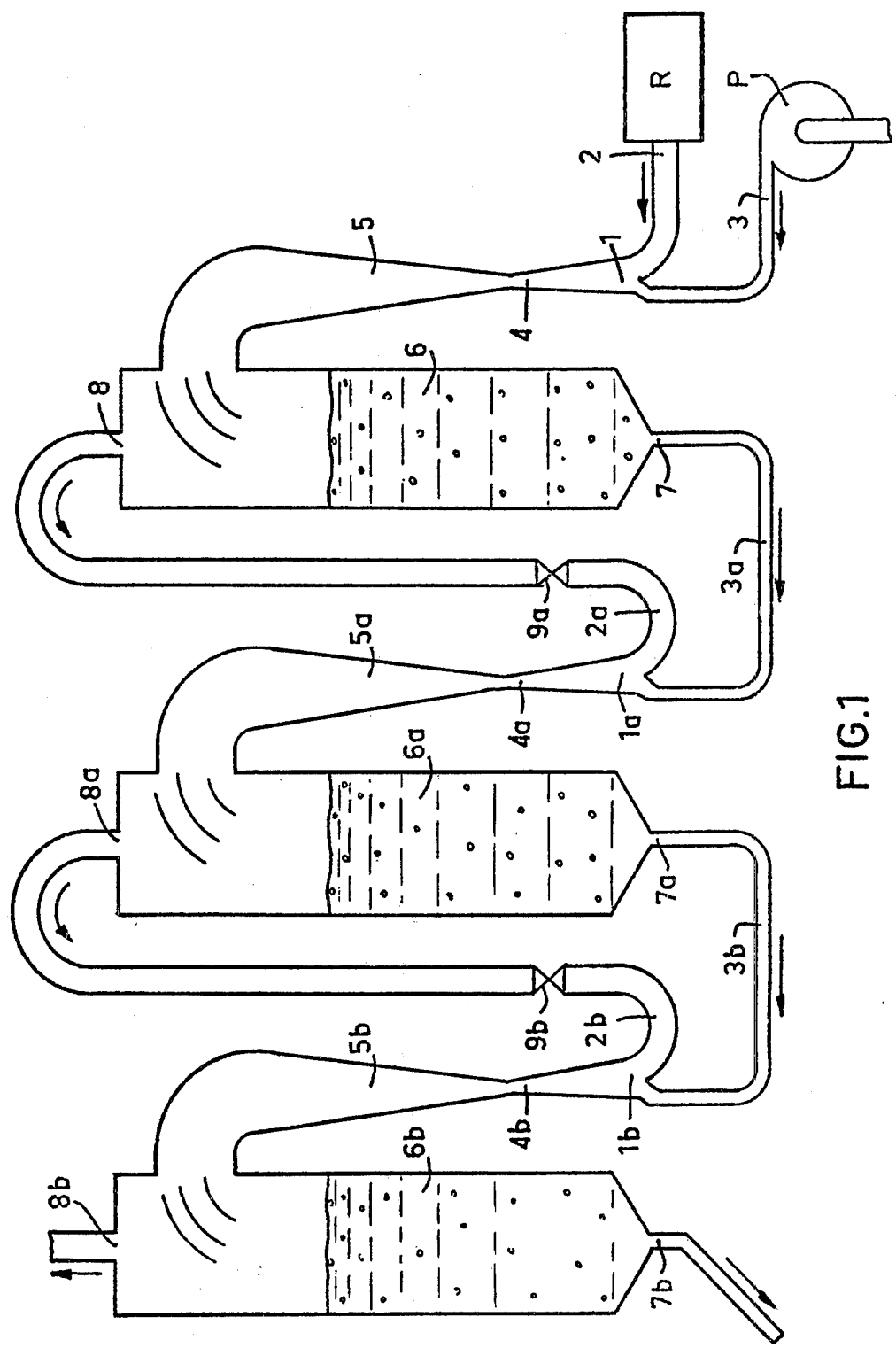

United States Patent [19]

Sterlini

[11] 4,124,660
[45] Nov. 7, 1978

[54] PROCESS AND APPARATUS FOR MIXING GASES AND LIQUIDS

[75] Inventor: Jacques Sterlini, Paris, France

[73] Assignee: CEM-Compagni Electro-Mecanique, Paris, France

[21] Appl. No.: 697,922

[22] Filed: Jun. 21, 1976

[30] Foreign Application Priority Data

Aug. 25, 1975 [FR] France .................................. 75 26157

[51] Int. Cl.² .............................................. B01F 3/04
[52] U.S. Cl. .................................... 261/21; 55/257 R; 261/DIG. 26; 422/189
[58] Field of Search .................... 55/25, 48, 44, 45, 51, 55/53, 55, 57, 85, 87, 93, 257 R, 40, 43, 178, 189; 261/20–22, 29, 65, 3, DIG. 26, DIG. 54; 23/252 R

[56] References Cited

U.S. PATENT DOCUMENTS

| | | | |
|---|---|---|---|
| 1,525,060 | 2/1925 | Bertsch ...................................... | 55/48 |
| 1,917,577 | 7/1933 | Doble, Jr. ................................. | 261/29 |
| 2,214,368 | 9/1940 | Greensfelder et al. ............... | 55/55 X |
| 2,428,643 | 10/1947 | Young ...................................... | 261/3 X |
| 2,765,045 | 10/1956 | Meyers ..................................... | 55/43 |
| 3,018,843 | 1/1962 | Mercier ................................... | 55/178 |
| 3,313,093 | 4/1967 | Guggenberger et al. ........ | 261/21 X |
| 3,401,502 | 9/1968 | Hailer et al. ......................... | 55/48 X |
| 3,559,375 | 2/1971 | Bidard ..................................... | 55/45 |
| 3,730,494 | 5/1973 | Sterlini .................................. | 261/21 |
| 3,811,663 | 5/1974 | Sterlini ............................... | 261/21 X |

*Primary Examiner*—Frank W. Lutter
*Assistant Examiner*—Kathleen J. Prunner
*Attorney, Agent, or Firm*—Burns, Doane, Swecker & Mathis

[57] ABSTRACT

The present invention relates to a process of, and equipment for, thorough mixing of gases and liquids.

Equipment in conformity with the invention comprises one or several sequences arranged in same-sense or counter-sense flows, and each in turn comprising: an emulsifier followed by a tapered conduit and an expanding conduit; then, by a pressurized vessel equipped with an exhaust orifice for the liquid and an exhaust orifice for the gas. The gas and the liquid in such a vessel are in contact the moment they are at the maximum pressure reached in the sequence.

The invention applies to chemical reactions, to dissolutions and wherever there is significance in achieving intimate contact between a gas and a liquid.

4 Claims, 2 Drawing Figures

PROCESS AND APPARATUS FOR MIXING GASES AND LIQUIDS

The present invention relates to a process of, and to equipment for, mixing a gas with a liquid, and in particular to a case wherein the gas and liquid remain in contact at relatively high pressures.

There had been proposed — and in particular in French Pat. No. 7,002,814 — a process for mixing a liquid with a gas by emulsification, the process to comprise at least three successive stages:

(a) The liquid is compressed at a pressure $p_1$ and brought to a speed exceeding 1 m/sec., while the gas is compressed to a pressure $p_o$ slightly higher than said pressure $p_1$;

(b) The gas is emulsified at said pressure $p_o$ in the liquid raised to said pressure $p_1$ and circulating at said speed, obtaining in this manner fine gas bubbles which are uniformly distributed throughout said circulating liquid;

(c) The emulsion formed in stage (b) is expanded to a pressure $p_2$ less than $p_1$ by being made to pass into an expansion zone comprising a nozzle, whereby the liquid emulsion is simultaneously accelerated, thereby ensuring intimate contact between gas and liquid, and (d) The gas is separated from the accelerated emulsion in stage (c).

This process furthermore may comprise an additional stage (e) in which the liquid obtained from the separation stage (d) — and therefore at high speed — is made to pass into a recompression zone consisting of a divergent hydrodynamic channel, whereby the liquid may be collected at a lesser speed and at a pressure $p_3$ which is at least equal to pressure $p_1$.

The whole of these operations is performed in the stages of a thermodynamic cycle during which the gas gives up energy to the liquid on account of its expansion, thus compensating for internal friction and allowing a high speed of circulation of the gaseous and liquid flows to be treated.

Equipment for implementing the above described process comprises a closed liquid circuit comprising, sequentially and in downstream order:

(1) means for injecting the gas into the liquid which is located in the high $p_1$ pressure zone;

(2) an expansion nozzle for the gas-liquid emulsion formed in (1); and (3) means for separating the gas from the emulsion following expansion in said nozzle, and further, complementarily (4) a diffusor receiving the liquid obtained following gas separation.

Clearly this equipment is particularly well suited to continuous operation. The gaseous and liquid flows are made to continuously interface in a closed loop from which may be extracted partial gas and liquid flows following intimate contact. Thus, the above described equipment generally comprises additional means for introducing the new liquid and also means for extracting a partial flow of treated liquid.

Gas and liquid compressions are carried out separately in this process, so that the gas and the liquid do not interface when they are in the vicinity of the maximum pressure obtained in each stage. Such a circumstance is unfavorable when, in addition to an emulsion, one also wishes to obtain gas dissolution in the liquid.

Such problems are encountered in varied parts of industry, for instance when a gas is desired to react with a liquid, and in particular if the solubility of the gas depends considerably on the pressure, or again if micron-size bubbles are desired in a liquid; such bubbles for instance are use in mineral floatation. Another application for instance is the isothermal compression of gases likely to dissociate because of their rise in temperature and which therefore could not be compressed by common and conventional techniques, for instance, ozone.

An object of the present invention is to resolve this problem and to provide a process and equipment for mixing a gas and a liquid and to maintain their contact at a fairly high pressure.

The process of the invention comprises the implementation of at least one operation designated as a sequence in which the gas and the liquid are made to change, and which comprises the following stages in succession:

(1) emulsification of the gaseous flow in the liquid flow by means of methods known per se;

(2) nozzle expansion of the emulsion;

(3) compression of the emulsion in a hydrodynamic diffusor with appreciable decrease in speed;

(4) separation within a pressurized vessel of at least part of the gas and liquid, the volume of said vessel being such that there will be sufficient dwell time of the liquid in contact with the gas to achieve the desired degree of progress in the reaction or dissolution. Preferably several sequences will be interrelated, the gas and the liquid circulating either in counterflow or in the same direction.

Figure 2:
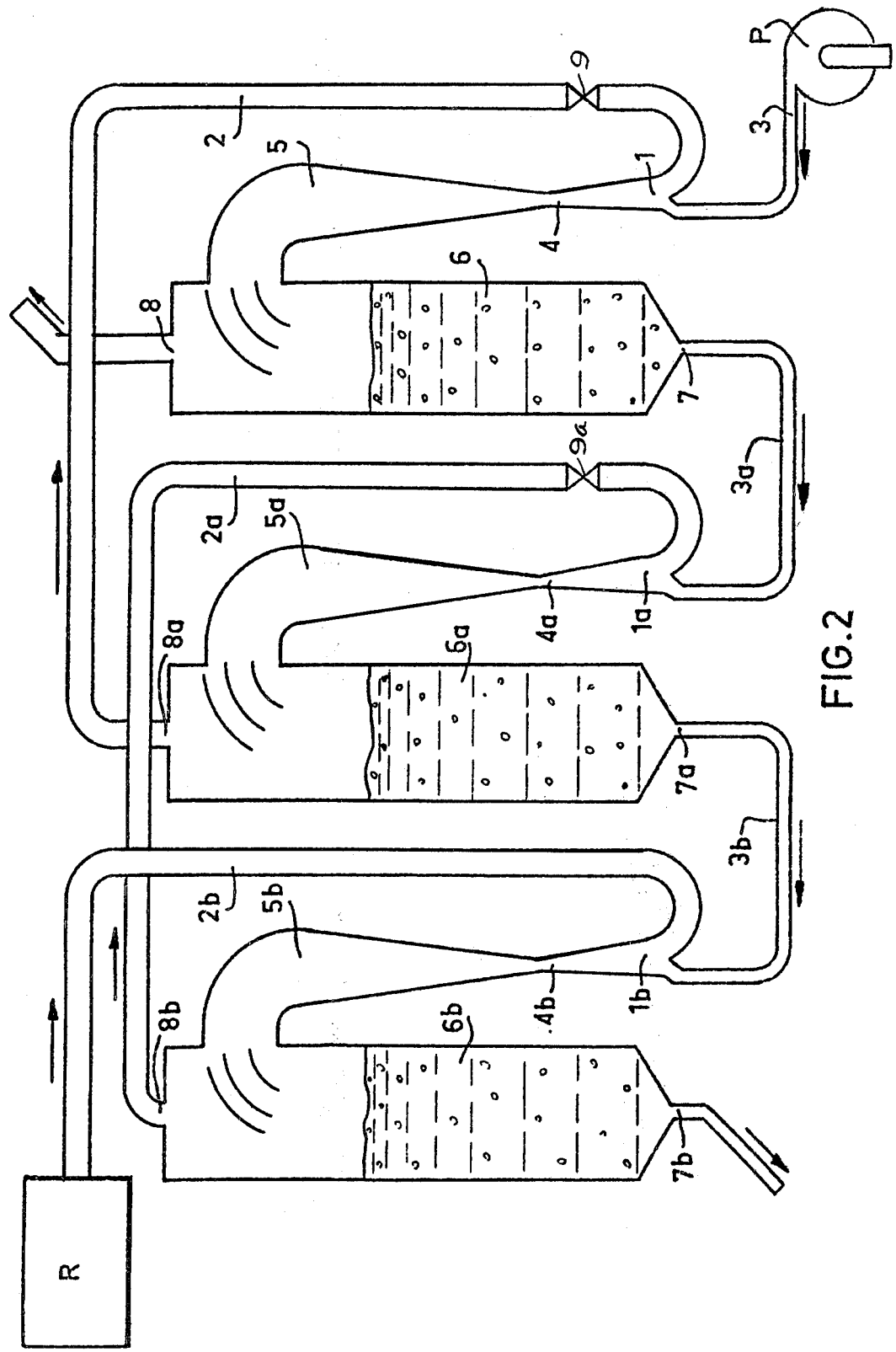

The equipment of the invention will be described in greater detail further below in conjunction with figures presenting illustrative embodiments of the invention, implying no restriction thereby:

FIG. 1 diagrammatically represents a set of three sequences arranged in same-sense flow; and FIG. 2 shows a set of 3 sequences arranged in counter-flow.

The same reference numerals are used in these figures to describe the same components or constituents; first, those phenomena will be described which take place in a single sequence, whether in a same-flow or counter-flow set.

The gas and liquid to be mixed arrive through conduits 2 and 3 in emulsifier 1 where an emulsion is formed by a known process. The emulsion is expanded in a tapered conduit 4, then compressed in diffusor 5 where it is subjected to pressure gradients allowing the gas bubbles to become smaller and to multiply, whereby the contact surface between liquid and gas is increased. The compression is possible because the speed V of the liquid at the entrance of the emulsifier is high enough to give to the emulsion the necessary energy to have the pressure of the emulsion increased. Thereupon the emulsion is admitted into a pressurized vessel 6 of which the volume is sufficiently large to allow enough time for the reaction to take place. The liquid leaves vessel 6 through orifice 7, the gas through orifice 8.

As regards the same-sense flow equipment shown in FIG. 1, gas and liquid pass through conduits 2a and 3a into emulsifier 1a of the next sequence, where the same components are found, indicated in FIG. 1 by index a; similarly for the next sequence where the same components are denoted by the index b.

As regards the counter-flow equipment shown in FIG. 2, the liquid leaving the first sequence through orifice 7 passes through conduit 3a into emulsifier 1a of the following sequence, the order of the sequences as chosen for the description being that of the circulation of the liquid, though, in contrast with the same-flow equipment described above, the gas exiting through orifice 8 is evacuated and it is the supply of gas 2 which is connected to the next sequence — more accurately to orifice 8a of vessel 6a of this sequence. The same arrangement is found again in the sequence for which the reference numerals are indexed by b. Because this sequence is the last in the example shown, its supply conduit 2b is connected to the gas supply line.

In both figures, R represents the gas supply, for instance a tank, and P is a pump to supply the liquid from a source not shown. Furthermore, the references 9, 9a, 9b represent an optional throttling mechanism mounted in the gas pipes 2, 2a, 2b between two consecutive sequences. The pressure of vessel 6 is controlled by throttling mechanism 9, 9a, 9b and by the cross-section of the exit orifices 7, 7a, 7b, 8, 8a, and 8b.

The energy corresponding to input losses of the whole system is provided by pump P and by the gas pressure in tank R. Considering the above discussion, generally the major part of this energy preferably will be supplied through the intermediary of this pump P. In this instance, the direction of decreasing pressures is that of the circulation of the liquid. As regards the same-sense flow equipment (FIG. 1), provision may be made that the gas and liquid after mixing both leave the equipment essentially at atmospheric pressure.

As regards the counter-flow equipment, provision may be made to introduce the gas at a slightly higher pressure into the equipment by resorting to a noticeably higher pressure, the required energy being supplied from pump P through the intermediary of the liquid; in this manner the the compression of the gas is essentially isothermal.

It may be observed that in such a process, the output conditions generally are determined in terms of pressure. As regards the usual case, the number of sequences therefore depends on the energy of the incoming gaseous and liquid flows and on the head losses in each sequence.

To achieve emulsification, the liquid must be supplied at a speed V of about several meters/second, whereby its pressure is somewhat lessened, and furthermore there must be a junction with the gaseous flow in the emulsifier. The drop in pressure of the liquid to impart speed to it may be obtained from the hydrostatic level in the vessel (one should not infer from the drawings that the successive vessels are at the same heights).

Throttling devices 9, 9a, 9b are meant to allow adjusting the pressures of the gas and liquid at the emulsifier level so as to obtain an emulsion under the best possible conditions.

Illustratively, the following same-sense flow equipment was set up:

Regarding an operational test, water with a head pressure of 4 bars absolute (58 psi) was introduced in the first emulsifier, the static pressure being equal to 1.5 bar (22 psi). The air was introduced in the emulsifier at a pressure of 1.5 bars absolute (22 psi). The ratio between the volume of air and the total volume in the emulsion (void fraction) was about 0.1. After separation in the first vessel where the pressure was equal to 2.9 bars absolute (42.5 psi), the air and the water were separately admitted in the second sequence. In the second vessel (6a) the pressure was 0.5 bar (7.3 psi) lower than the pressure in the first vessel (6).

I claim:
1. A process to implement intimate contact between a gas and a liquid, which comprises the following stages:
    (a) forming an emulsion of the gas in the liquid, said liquid being raised to a pressure $p_1$ and circulating at a speed V, thereby obtaining fine bubbles which are uniformly distributed in said circulating liquid;
    (b) expanding the emulsion formed in stage (a) to pressure $p_2$ less than $p_1$ by causing the same to pass into an expansion zone comprising a nozzle, the emulsion thereby being simultaneously accelerated while intimate contact between the gas and the liquid is ensured;
    (c) compressing the emulsion by decreasing its speed in a hydrodynamic diffusor, and
    (d) separating the gas from the liquid in a pressurized vessel the volume of which is such that the dwell time of the liquid having dissolved part of the gas suffices to ensure the desired contact between gas and liquid.

2. A unit assembly of apparatus for implementing intimate contact between a gas and a liquid which comprises an emulsifier (1) with a gas intake (2) and a liquid intake (3), followed by a tapered conduit (4), and a hydrodynamic diffusor (5) and then by a pressurized vessel (6) equipped with an exhaust orifice (7) for the liquid and with an exhaust orifice (8) for the gas, the exhaust orifice for the gas comprising a throttling means.

3. Apparatus as defined in claim 2 wherein said unit assembly is the first unit assembly in a succession of unit assemblies in which in the first unit assembly the exhaust orifice (7) for the liquid is connected to the liquid intake (3a) of the emulsifier (1a) of a following unit assembly, and the exhaust orifice (8) for the gas of the first unit assembly is connected to the gas intake (2a) of the emulsifer of the following unit assembly.

4. Apparatus as defined in claim 2 wherein said unit assembly is the first unit assembly in a succession of unit assemblies in which in the first unit assembly the exhaust orifice (7) for the liquid is connected to the liquid intake (3a) of the emulsifier (1a) of a following unit assembly and the gas intake (2) of the emulsifier (1) of the first unit assembly is connected to the exhaust orifice (8a) for the gas of the following unit assembly.

* * * * *